United States Patent
Jadhav

(10) Patent No.: US 10,853,306 B2
(45) Date of Patent: Dec. 1, 2020

(54) CLOUD-BASED DISTRIBUTED PERSISTENCE AND CACHE DATA MODEL

(75) Inventor: Ajay Jadhav, Mamaroneck, NY (US)

(73) Assignee: Ajay Jadhav, Mamaroneck, NY (US)

( * ) Notice: Subject to any disclaimer, the term of this patent is extended or adjusted under 35 U.S.C. 154(b) by 512 days.

(21) Appl. No.: 13/565,171

(22) Filed: Aug. 2, 2012

(65) Prior Publication Data

US 2013/0110961 A1    May 2, 2013

Related U.S. Application Data

(60) Provisional application No. 61/514,253, filed on Aug. 2, 2011.

(51) Int. Cl.
    *G06F 15/167*      (2006.01)
    *H04L 29/08*      (2006.01)

(52) U.S. Cl.
    CPC ........ *G06F 15/167* (2013.01); *H04L 67/1097* (2013.01); *H04L 67/288* (2013.01); *H04L 67/2842* (2013.01)

(58) Field of Classification Search
    CPC ...... G06F 3/061; G06F 3/0608; G06F 12/109; G06F 12/084; G06F 12/1054; G06F 12/0871; G06F 12/0873; G06F 12/023; G06F 9/28; G06F 9/30061; G06F 9/30094; G06F 9/30149; G06F 9/3017; G06F 9/3842; G06F 9/443; G06F 9/465;
(Continued)

(56) References Cited

U.S. PATENT DOCUMENTS 5,493,692 A * 2/1996 Theimer .............. G06Q 10/107
                                                      340/5.74
6,594,751 B1 * 7/2003 Leivent ............... G06F 12/0866
                                                      711/118
(Continued)

FOREIGN PATENT DOCUMENTS

| JP | 2003-6036 A | 1/2003 |
| JP | 2004-280494 A | 10/2004 |

(Continued)

OTHER PUBLICATIONS

"International Preliminary Report on Patentability received for PCT Application No. PCT/US2012/049245, dated Feb. 13, 2014", 7 pages.

(Continued)

*Primary Examiner* — Tonia L Dollinger
*Assistant Examiner* — Joseph M Cousins
(74) *Attorney, Agent, or Firm* — Wiley Rein LLP

(57) ABSTRACT

A distributed cache data system includes a cache adapter configured to reserve a designated portion of memory in at least one node in a networked cluster of machines as a contiguous space. The designated portion of memory forms a cache and the designated portion of memory includes data cells configured to store data. The cache adapter is configured to interface with the data and a distributed file system and the cache adapter is further configured to provide an interface for external clients to access the data. The cache adapter is configured to communicate to clients via a web server, and the cache adapter is further configured to direct data access requests to appropriate the data. A related process of distributing cache data is disclosed as well.

17 Claims, 11 Drawing Sheets

(58) Field of Classification Search
CPC .... G06F 9/3826; G06F 9/3828; G06F 9/3853;
G06F 9/3891; G06F 11/1407; G06F
12/1063; G06F 13/4022; G06F 9/264;
G06F 9/3885; G06F 12/0844; G06F
12/0875; G06F 9/30025; G06F 9/30178;
G06F 9/321; G06F 9/3802; G06F 9/3804;
G06F 9/3814; G06F 9/3824; G06F
17/30902; G06F 17/30194; G06F
17/3048; G06F 3/065; G06F 3/064; G06F
3/0643; G06F 11/1453; G06F 2212/7207;
G06F 8/65; G06F 12/0292; G06F
12/0862; G06F 17/30159; G06F 12/10;
G06F 17/30174; G06F 3/0641; G06Q
10/06; G06Q 50/04; G06Q 50/01; H04L
12/5694; H04L 49/90; H04L 49/9015;
H04L 49/9042; H04L 49/9052; H04L
67/14; H04L 67/1027; H04L 67/22; H04L
67/125; H04L 29/12056; H04L 29/12132;
H04L 41/0806; H04L 41/0846; Y10S
707/99948
USPC ....... 709/213–216, 223, 224, 201, 203, 218;
711/118, E12.005, 202, 218, E11.008,
711/E12.023, 103, 119, 147, 114,
711/E12.002, 130, 3; 707/E17.12,
707/999.01, 999.001, 999.2
See application file for complete search history.

(56) References Cited

U.S. PATENT DOCUMENTS

| | | | |
|---|---|---|---|
| 6,854,115 B1 | 2/2005 | Traversat et al. | |
| 6,874,006 B1 | 3/2005 | Traversat et al. | |
| 7,043,538 B2* | 5/2006 | Guedalia et al. | 709/220 |
| 7,809,882 B1 | 10/2010 | Liu et al. | |
| 8,775,737 B2* | 7/2014 | Hsieh et al. | 711/118 |
| 8,935,366 B2* | 1/2015 | Mehr et al. | 709/220 |
| 2001/0042171 A1* | 11/2001 | Vermeulen | 711/118 |
| 2002/0091712 A1* | 7/2002 | Martin et al. | 707/200 |
| 2002/0198883 A1 | 12/2002 | Nishizawa et al. | |
| 2003/0065826 A1* | 4/2003 | Skufca et al. | 709/315 |
| 2003/0084056 A1* | 5/2003 | DeAnna et al. | 707/100 |
| 2003/0154349 A1* | 8/2003 | Berg | G06F 9/342 711/137 |
| 2004/0030758 A1* | 2/2004 | Cherdron | G06F 17/3089 709/218 |
| 2004/0193574 A1 | 9/2004 | Suzuki | |
| 2005/0080996 A1* | 4/2005 | Loafman | 711/136 |
| 2005/0209991 A1* | 9/2005 | Rogers | G06F 3/0607 |
| 2006/0041731 A1* | 2/2006 | Jochemsen | G06F 12/0223 711/170 |
| 2006/0136564 A1* | 6/2006 | Ambrose | 709/217 |
| 2007/0022148 A1* | 1/2007 | Akers | G06F 17/30138 |
| 2007/0239791 A1* | 10/2007 | Cattell | G06F 17/30 |
| 2008/0140937 A1* | 6/2008 | Nalawade et al. | 711/119 |
| 2009/0024794 A1* | 1/2009 | Iyer et al. | 711/118 |
| 2009/0063781 A1 | 3/2009 | Ebersole | |
| 2009/0144349 A1* | 6/2009 | Phillips | G06F 12/0261 |
| 2009/0240664 A1 | 9/2009 | Dinker et al. | |
| 2010/0030748 A1* | 2/2010 | Netz et al. | 707/3 |
| 2010/0174939 A1 | 7/2010 | Vexler | |
| 2010/0186011 A1 | 7/2010 | Magenheimer | |
| 2010/0192004 A1* | 7/2010 | Bauchot | G06F 17/30997 714/2 |
| 2010/0250748 A1* | 9/2010 | Sivasubramanian | G06F 9/5016 709/226 |
| 2011/0016090 A1* | 1/2011 | Krishnaprasad | H04L 67/2842 707/648 |
| 2011/0041006 A1 | 2/2011 | Fowler | |
| 2011/0066597 A1* | 3/2011 | Mashtizadeh | G06F 3/0617 707/640 |
| 2011/0082946 A1 | 4/2011 | Gopalakrishnan | |
| 2011/0138123 A1* | 6/2011 | Gurajada et al. | 711/118 |
| 2011/0191308 A1* | 8/2011 | Lowry et al. | 707/705 |
| 2011/0196887 A1* | 8/2011 | Kennberg | 707/769 |
| 2011/0196901 A1* | 8/2011 | Kesselman | G06F 17/30336 707/813 |
| 2011/0246518 A1* | 10/2011 | Mehrotra et al. | 707/770 |
| 2011/0258378 A1* | 10/2011 | Ananthanarayanan | G06F 3/061 711/114 |
| 2012/0042248 A1* | 2/2012 | Hyman | 715/716 |
| 2012/0117351 A1* | 5/2012 | Motwani et al. | 711/165 |
| 2012/0159480 A1* | 6/2012 | Matsuzawa | G06F 9/45558 718/1 |

FOREIGN PATENT DOCUMENTS

| | | |
|---|---|---|
| JP | 2004-295683 A | 10/2004 |
| WO | 2013/019913 A1 | 2/2013 |

OTHER PUBLICATIONS

Office Action received for Canadian Patent Application No. 2,843,886, dated Mar. 26, 2019, 5 pages.
Office Action received for Japanese Patent Application No. 2017-183619, dated Oct. 9, 2018, 9 pages (English Translation Only).
Masayoshi, Hagiwara, "Technology and Product Skill Cloud Design Theory (2) Rethinking the Architecture (2) Key Distributed Cache, Separation of Update and Reference Data", Nikkei Systems, Nikkei BP Corporation, ISSN 1881-1620, 2010, pp. 89-93.
Sugi, et al., "In-Memory Architecture to Speed Up the Data Processing", IT Architects, IDG Japan, vol. 22, ISBN 978-4-87280-293-1, May 14, 2009, pp. 44-55.
International Search Report and Written Opinion issued in related application No. PCT/US2012/049245 dated Oct. 19, 2012.

* cited by examiner

CLOUD-BASED DISTRIBUTED PERSISTENCE AND CACHE DATA MODEL

CROSS-REFERENCE TO RELATED APPLICATIONS

This application claims the benefit from U.S. Provisional Application No. 61/514,253, filed on Aug. 2, 2011, which is hereby incorporated by reference for all purposes as if fully set forth herein.

TECHNICAL FIELD

The present invention provides systems and methods for increased scalability and decreased latency of cloud computing using a cloud-based distributed persistence and cache data model, with a Structured Query Language (SQL) application interface.

BACKGROUND OF THE INVENTION

Cloud computing environments may provide infrastructure, applications and software through a network over the web. Initial web based infrastructure was based on a mainframe or a server based relational database model and n-tiered network clustered application server. As the web matured, and became an interactive platform, the infrastructure broke into two fronts—the data tier and the applications tier. There are numerous solutions for the application tier, and linear scalability can be achieved rather easily by using off-the-shelf solutions, where the application tier provides the View and the Controller in a Model View Controller (MVC) architecture. The data tier essentially constitutes the Model in a MVC architecture. The data tier provides unstructured/structured data for the applications using one of the database management systems, including relational databases, object oriented databases and key/value pair databases.

Relational Database

Relational databases are well known in the art. A relational database is a standardized datastore that stores various data types in the form of bits and bytes in structured tables that can be accessed using Structured Query Language (SQL). The origins of relational databases can be traced to relational algebra. The basic premise of today's relational database offerings is that the data should be accessible independent of any hardware or software via standardized interfaces. In its infancy, the data elements were stand alone with minimal or zero relationship attributes. As the database engines became more powerful, the data structures and relational data graphs became more complicated as did the relationships between the tables and data elements. Essentially, a relational database is a collection of tables that consists of rows and columns with a SQL interface for applications accessing the database. The relational databases have so far offered the best mix of simplicity, robustness, flexibility, performance, scalability, and compatibility in managing generic data. Regardless of the vendor supplying the database, all relational databases require the data to be structured, with no exceptions. The drawback of relational database management systems (RDBMS), is that it cannot be distributed across physical machine boundaries seamlessly on a network dynamically or automatically unless one makes use of partitioning and/or sharding, which requires manual intervention and maintenance.

This manual intervention is needed to overcome physical limits on the amount of data that can be stored within the physical boundaries of a single machine or an external data array. Before the advent of the web 2.0 and its massive data scale, the above scenario could work forever as the computing power of a single machine with multicore computer processing units grew faster than the data growth of most organizations; however, the data scale for current applications is growing exponentially on a daily basis, and the above premise does not hold true. The above shortcomings, in addition to extremely prohibitive license and support costs, make relational databases disadvantageous for present and future cloud based applications with a data scale that is in exabyte and zettabyte.

Relational/Object Relational Database

Relational database design preceded the object oriented design paradigm by a generation or two and thus lacks true support for complex object graphs. Advances in the complexity of information have caused another drawback to relational databases. Relational databases are specifically made for organizing data by common characteristics. Complex images, numbers, designs and multimedia products defy easy categorization and leads to complex object graphs that eventually turn into unstructured data, leading the way for a new type of database called object-relational database management systems. Current systems are designed to handle the more complex applications and need the ability to be scalable and distributable in the cloud. Object relational databases do not fit the bill as they are not scalable or network distributable and, thus, are unsuitable.

KeyNalue Database

The new Web 2.0 paradigm deals with data that is measured in terms ofterabytes and petabytes as opposed to gigabytes. Although relational databases have been around for forty years, they are not suited to handle data that grows by leaps and bounds by the magnitude of terabytes on a daily basis. The primary reason for this shortcoming is that for the relational database, the scalability is directly related to the computing power of the underlying machine or partitioned machines. Prior to the advent of the Web 2.0 that added the social networking aspect to every facet of computer processing, advances in server design allowed the databases to scale to service the application needs; however, in order to handle the large amounts of data that is in petabytes and higher, a new kind of database management system is taking hold, making use of key/value stores, also known as non-relational database management systems (non-RDBMS) or schema-less databases. This new kind of database management system is commonly called a non-relational and/or NoSQL database that makes use of key/value store. In fact, no standard name yet exists, so it may be referred to as a document-oriented, Internet-facing, attribute-oriented, distributed database (although this can be relational also), sharded sorted arrays, distributed hash table, or key/value database. While each of these names point to specific traits of this new approach, they are all variations on one theme, which we will call key/value databases. Several options are available in the marketplace today with this new key/value approach, including the following.

Cassandra is an open source distributed database management system. It is an Apache Software Foundation top-level project designed to handle very large amounts of data spread out across many commodity servers while providing a highly available service with no single point of failure. It is a NoSQL solution that was initially developed by Facebook and powers their Inbox Search feature. Cassandra is a BigTable data model running on an Amazon Dynamo-like infrastructure.

Cassandra provides a structured key-value store with eventual consistency. Keys map to multiple values, which are grouped into column families. The column families are fixed when a Cassandra database is created, but columns can be added to a family at any time. Furthermore, columns are added only to specified keys, so different keys can have different numbers of columns in any given family.

The values from a column family for each key are stored together, making Cassandra a hybrid between a column-oriented DBMS and a row-oriented store.

Apache CouchDB, commonly referred to as CouchDB, is a free open source document-oriented database written in the Erlang programming language. It is a NoSQL product designed for local replication and to scale vertically along a wide range of devices. CouchDB is supported by commercial enterprises CouchOne and Cloudant.

Hypertable is an open source database inspired by publications on the design of Google's BigTable. The project is based on the experience of engineers who were solving large-scale data-intensive tasks. Hypertable runs on top of a distributed file system (DFS) such as the Apache Hadoop DFS, GlusterFS, or the Kosmos File System (KFS). It is written almost entirely in C++ for performance.

MongoDB is an open source, scalable, high-performance, schema-free, document-oriented database written in the C++ programming language. The database is document-oriented so it manages collections of JSON-like documents. Many applications can, thus, model data in a more natural way, as data can be nested in complex hierarchies and still be query-able and indexable. Development of MongoDB began in October 2007 by lOgen. The first public release was in February 2009.

Tokyo Cabinet is a library of routines for managing a database. The database is a simple data file containing records, each a pair of a key and a value. Every key and value are serial bytes with variable length. Both binary data and character string can be used as a key and a value. There is neither the concept of data tables nor data types. Records are organized in hash table, B+ tree, or fixed-length array. Tokyo Cabinet was developed as the successor of GDBM and QDBM.

Voldemort is not a relational database; it does not attempt to satisfy arbitrary relations while satisfying ACID properties; nor is it an object database that attempts to transparently map object reference graphs; nor does it introduce a new abstraction such as document-orientation. It is basically a big, distributed, persistent, fault-tolerant hash table. For applications that can use an 0/R mapper like active-record or hibernate, Voldemort will provide horizontal scalability and a much higher availability, but at a greater loss of convenience. For large applications under internet-type scalability pressure, a system likely consists of a number of functionally partitioned services or application programming interfaces, which may manage storage resources across multiple data centers using storage systems, which may themselves be horizontally partitioned. For applications in this space, arbitrary in-database joins are already impossible since all the data is not available in any single database. A typical pattern is to introduce a caching layer, which would require hashtable semantics anyway.

Drizzle can be thought of as a counter-approach to the problems that key/value stores are meant to solve. Drizzle began life as a spin-off of the MySQL (6.0) relational database. Over the last few months, its developers have removed a host of non-core features (including views, triggers, prepared statements, stored procedures, query cache, ACL, and a number of data types), with the aim of creating a leaner, simpler, faster database system. Drizzle can still store relational data; and the aim is to build a semi-relational database platform tailored to web- and cloud-based apps running on systems with 16 cores or more.

The biggest drawback of distributed key/value databases such as the foregoing for applications with complex object graphs is the latency in response time and the lack of functionality that one takes for granted in any off the shelf generic relational database. Most if not all of the social networking applications today entail extremely complicated object graphs.

BigTable is a compressed, high performance, and proprietary database system built on Google File System, Chubby Lock Service, SSTable and a few other Google programs; it is currently not distributed or used outside of Google, although Google offers access to it as part of their Google App Engine.

HBase is an open source, non-relational, distributed database modeled after Google's BigTable and is written in Java. It is developed as part of Apache Software Foundation's Hadoop project and runs on top of Hadoop Distributed File System, providing BigTable-like capabilities for Hadoop. It provides a fault-tolerant way of storing large quantities of sparse data.

Database Memory Cache

With the advent of the dynamic web, the latency of data access times started affecting the performance of web pages. Latency in data access times for both read and write are related linearly to access times of the hard drives that hold the persistent data. To remove the bottleneck of accessing disks for information, computer developers came up with the concept of Shared Memory/Cache, as a way to reserve a portion of memory (RAM) in the server for frequent reads of the same data. Having cached data for reads eliminated the need for frequent disk access, thus reducing data latency. With the advent of time, the cache has grown more exotic. Various available options include Google Cache; CSQL Cache—caches tables from MySQL, Postgres and Oracle; memcached—caches result set of queries; TimesTen—caches ORACLE tables; and SafePeak—an automated caching of result sets of queries and procedures from SQL Server, with automated cache eviction for full data correctness. Memcached is a free and open source, high-performance, distributed memory object caching system, generic in nature, but intended for use in speeding up dynamic web applications by alleviating database load. Memcached is an in-memory key-value store for small chunks of arbitrary data (strings, objects) from results of database calls, application programming interface calls, or page rendering.

All three mainstream approaches to interaction between structured data and applications (along with cache) have pros and cons. The present invention provides a solution for the new cloud based paradigm by presenting, in a single package, a datastore that is both fully functional relationally and fully distributable in a cloud.

SUMMARY OF THE INVENTION

The present invention provides systems and methods for increased scalability and decreased latency in the database tier for cloud computing. These include systems comprising a cache adapter capable of storing data in either a relational, or non-relational (structured, or unstructured) database format, wherein the cache adapter is in communication with a distributed file system on the backend of the data cache for data persistence and a client cache on the front end of the client database (cache) for data synchs from the distributed file system.

BRIEF DESCRIPTION OF THE DRAWINGS

The accompanying drawings, which are included to provide a further understanding of the invention and are incorporated in and constitute a part of this specification, illustrate exemplary embodiments of the invention that together with the description serve to explain the principles of the invention.

DETAILED DESCRIPTION OF THE INVENTION

Figure 1:
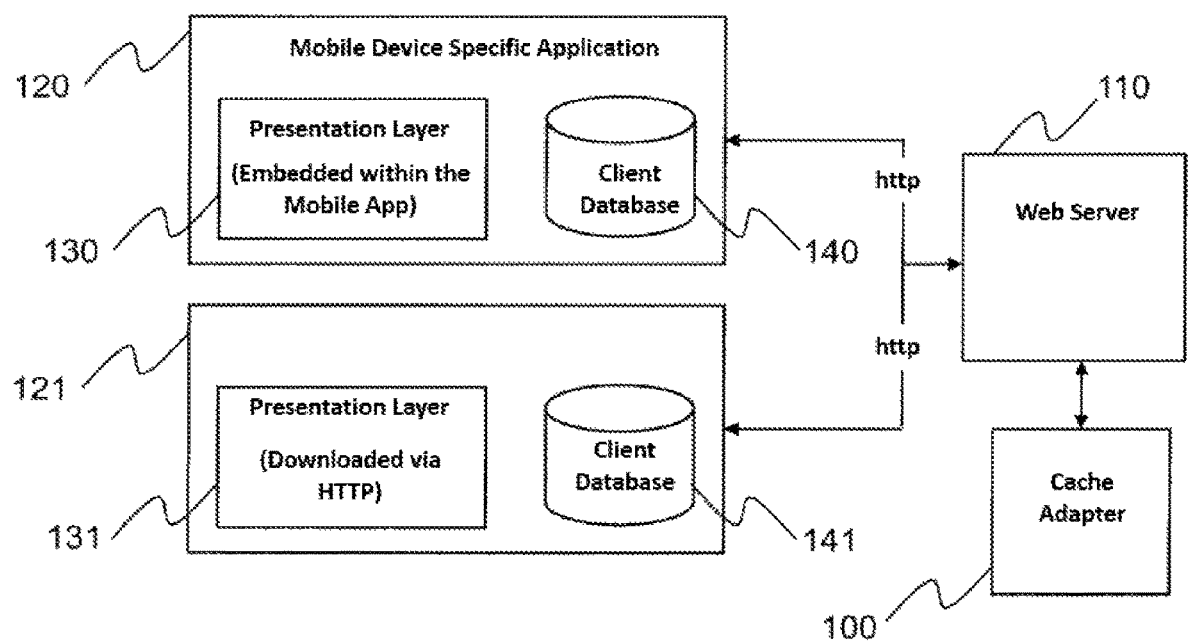
FIG. 1 is a diagram depicting data flow between the cache adapter and the client in an embodiment of the present invention.

The present invention is not limited to the particular methodology, compounds, materials, manufacturing techniques, uses, and applications described herein, as these may vary. The terminology used herein is used for the purpose of describing particular embodiments only, and is not intended to limit the scope of the present invention. The singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and sub-servient means. All conjunctions used are to be understood in the most inclusive sense possible. Thus, the word "or" should be understood as having the definition of a logical "or" rather than that of a logical "exclusive or" unless the context clearly necessitates otherwise. Structures described are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

All patents and other publications identified are incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "in communication with" as used herein refers to any coupling, connection, or interaction using electrical signals to exchange information or data, using any system, hardware, software, protocol, or format.

The term "virtual" or "virtualization" as used herein refers to a logical representation of some other component, such as a physical disk drive. In other words, the "virtual" component is not actually the same as the physical component it represents but appears to be the same to other components, hardware, software, etc. of a computer system.

The term "disk" as used herein refers to a storage disk or other memory that can store data for a computer system.

The term "cloud" or "cloud computing" as used herein refers to Internet-based computing, whereby shared resources, software, and information are provided to computers and other devices on-demand, like a public utility.

Cloud computing is, in a broad sense, the virtualization of standard components of a computer system. It takes both the data and software typically contained within a singular computer and spreads those, as well as other, components apart. For example, a client or user may access a server or database to obtain information through a program where the information is stored in one location, the query is processed by the software in another location and the client is in still a further location. Indeed, software can create a virtual server that acts as a single server while maintaining data storage in multiple, disparate physical locations. Regardless of the software mechanism used to access the data, a query process typically includes a cache, which acts as a relational database instance, with a distributed file system for data persistence. The cache is a data storage component that stores or retrieves the data from the distributed file system in a manner that allows the data to be stored in the distributed file system or served faster in response to a client request. The data stored in a cache may be a copy of data stored elsewhere in the system or it may be data that was generated in response to an earlier client request or query. All of the data in the cache is eventually synched with the distributed file system and the client cache. A cached data storage map directory that holds the location of the data cells is typically used as an intermediary to communicate with the data cells in the cache.

The various embodiments of the present invention are designed to improve speed in accessing and storing data, as well as to provide increased scalability. In one embodiment, the cache adapter would comprise data cells capable of storing data in a relational database table format, wherein the cache adapter is in communication with a distributed file system and a client cache. In another embodiment, the cache adapter would comprise data cells in multiple database instances capable of storing data in a relational database table format, wherein the cache adapter is in communication with a distributed file system and a client cache. A cache adapter is contemplated that may embed the cache and maintain a backend connection to the distributed file system together with a front-end client database residing on a client machine. In an alternate embodiment, the cache adapter may communicate between an existing cache and a relational or other type of database as an intermediary to the distributed file system. The cache adapter may consist of small data cells. The cache adapter is responsible for moving data between the data cells in the cache and the distributed file system.

Figure 3:
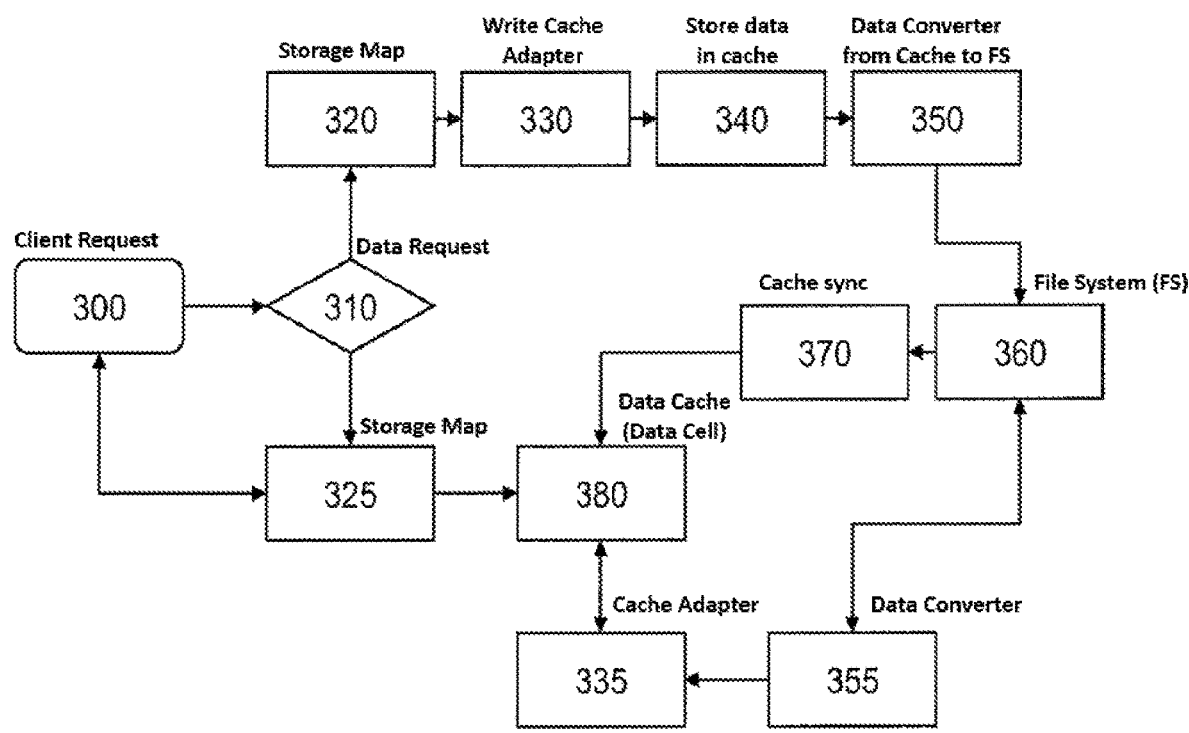
FIG. 3 is a flow chart of data flow following a client request made using an embodiment of the present invention.

In an embodiment of the present invention, a cache adapter resides in front of a cloud distributed file system. This cache adapter creates the CloudCache and provides the interface for all external clients to access the database. This CloudCache is a contiguous space that stretches across all available designated systems described within the configuration file. The cache adapter directs data access requests to appropriate data cells stored within the cloud. These data cells allow data to persist permanently within the cache that is distributed in the cloud, in addition to the cloud distributed file system. Further, the cache adapter may allow for access, if needed, to the data that resides on the cloud distributed file system directly without going through cache. This enables large bulk loads or large data retrievals, which can alleviate the need to access multiple data cells in a single request. Upon a request for data from the client, the cache adapter first checks if the data is available within the cache; if the cache does indeed have the requested data, the system serves out the data from the cache. However, if the data does not exist within the cache, the system automatically retrieves the data from the distributed file system and caches it before sending the data to the client, thereby fulfilling the data request. This process is set forth below along with the data flow diagram in FIG. 3.

Figure 11:
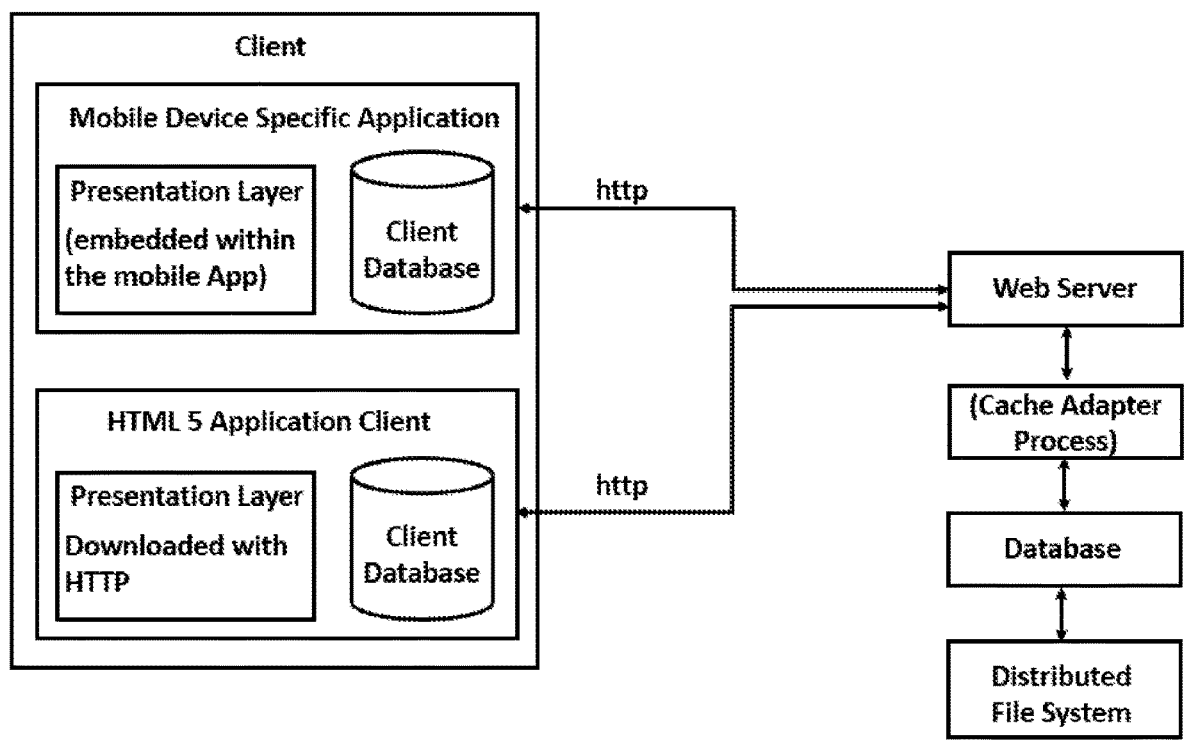
FIG. 11 a diagram depicting the architecture of certain embodiments of the present invention where the cache adapter may interact with the database for data persistence purposes and the database would then store data in the distributed file system.

In a particular embodiment, the cloud distributed cache functions as a relational database with a SQL interface for applications interfacing with this cache adapter. The cache may also be supported on the backend by a fully distributable file system in the cloud for data persistence, as depicted, for example, in FIG. 11. Using this setup allows the database to grow as a function of hardware in a linear fashion and potentially offer infinite scaling. There may be an eventual threshold, likely in the realm of an excess of exabytes. The cache adapter of the present invention may be integrated with a distributed file system. This adapter could be fully responsible for taking the data from the cache in a structured relational data format, then converting it to a distributed file system, or to an intermediary database, for storage dynamically in real time, and on the return route converting the data from a distributed file system, or the intermediary database, into the cache compliant format.

Adapter Framework and Data Flow

As seen, for example, in FIG. 1, all external clients interface with the cache adapter via a web server, which facilitates a gateway for the clients to communicate with the database using a standard secure https interface. The cache adapter 100 communicates bi-directionally with a web server 110 which then communications bi-directionally with the client. The client may be a mobile device specific application client 120 or an HTML 5 application client 121. A presentation layer 130, 131 and a client database 140, 141 are contained within the client 120, 121.

The cache adapter may interface internally with the data cells and the file system using a standard Java Database Connectivity (JDBC) interface. Each individual data cell would persist the data permanently in the cloud distributed file system. The data residing in the cache would be in a structured form similar to that of a relational database table format. However, the data residing in the cloud distributed file system is in the unstructured format. The adapter process framework is required to convert the data from one format to the other depending on the requirements of the function call, read/write.

Figure 2:
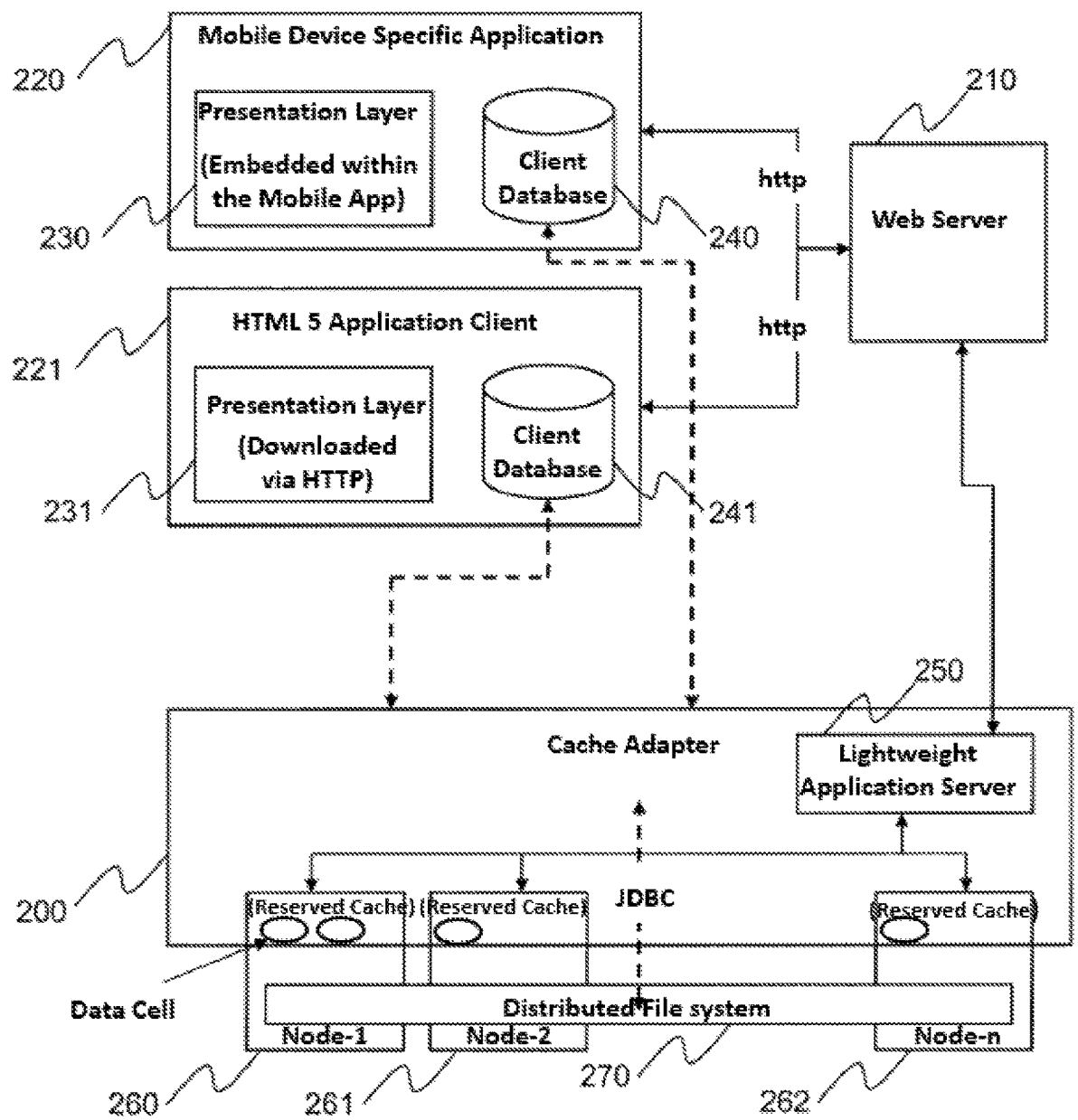
FIG. 2 is a diagram depicting data flow and synchronization between the distributed file system and the client, utilizing the cache adapter in an embodiment of the present invention.

In the normal scheme of things, cache (alternatively, CloudCache when it refers to cache as a one contiguous unit spanning across multiple machines), is the reserved portion of the memory. As depicted in FIG. 2, the cache adapter 200 reserves a designated portion of individual RAM of one or more nodes 260, 261, 262 in the networked cluster of machines (physical and/or virtual), as a contiguous space, a CloudCache, for its own use. The process further establishes two connections, one from the CloudCache to the underlying distributed file system and the other from the Cloud-Cache to the cloud via a lightweight application server 250 and a web server 210. The cache adapter uses this designated memory space for storing data in data cells. Each data cell is flexible in terms of its data size, however, there is an upper limit designated in the configuration file for ease of maintenance and consistent functioning of the entire infrastructure. External applications may interface with the cache adapter using an interface that is an extension of a standard JDBC interface or a standard https interface. External applications cannot communicate directly with the data cells. The data cells are integral parts of the process.

The cache adapter stores the data in the data cells within cache in a relational database table format. This differs from the traditional Relational Database Management System (RDBMS) in the sense that the data resides in cache and not in a standard operating system file system, including a distributed file system. The data residing in cache is persistent and not volatile; the cloud distributed file system is used for persistence. Traditional RDBMSs store the data on a disk file system, and some databases do allow some portion of the data to be cached for lower latency, however, neither of the two mediums is fully distributed in the cloud as a single entity. Sharding (partitioning) may provide similar functionality, but is not seamless, and thus requires substantial customization and has other limitations.

The data cells contain user data for a single or multiple users. Each individual data cell contains multiple data tables. These tables contain data for single or multiple users. The cache adapter automatically figures out the data space requirements of the user and either retrieves the data for the user or stores new data inputted by the user.

The cache adapter communicates with the external distributed file system and converts the data from the client cache to the distributed file system and from the distributed file system to the client database as depicted in FIGS. 1 and 2.

The ensuing description provides embodiments only, and is not intended to limit the scope, applicability, or configuration of the invention. Rather, the ensuing description will provide those skilled in the art with an enabling description for implementing the embodiments. It should be understood that various changes may be made in the function and arrangement of elements without departing from the spirit and scope of the claims. For example, the present invention is contemplated to find application with social networking, client/customer management and service, financial and business services, health care records management, transactions management, sales, marketing, analytics, security threats, intelligence gathering, and collaboration.

Example—Architectural System & Components for a Cloud Based Social Networking Infrastructure In a particular embodiment of the present invention, the cache adapter provides an improvement to existing social networking site architecture, by improving both performance and scalability. Social networking sites, such as Facebook®, Twitter®, LinkedIn®, and the like, are nothing more than some form of a subset of the Contact Relationship Management (CRM) spectrum. These networking sites allow their authorized users (individuals/entities) to create personal profiles and then build, expand and nurture their social relationships as they interact with one another. Most sites within this subset of the CRM spectrum utilize an Internet browser as a client that interacts with a n tiered web infrastructure. The present invention may be utilized to provide a next generation social networking site that is supported by a robust architecture that is both interactive and massively scalable. The system of the present invention consists of a client that is supported by a back-end infrastructure.

All major offerings that exist in the marketplace today make use of an Internet browser that a client interacts with. The client either retrieves or submits new information through this Internet browser. The browser forwards the requests over to an application server, which processes these incoming requests. As part of the process, the application tier interacts with a database on the back-end. Most sites like these are supported by a relational database on the back-end; creating a bottleneck in the flow of data. The relational database approach includes the following drawbacks: (1) the architecture is based on an asynchronous http request and response system that requires an uninterrupted Internet connection; without an Internet connection, the browser stalls and stops responding; (2) the response times are generally slow; (3) adding features is a daunting task as it requires concurrent changes on both the application tier and the backend database; (4) software upgrade release cycles are difficult and time consuming; and (5) maintaining the infrastructure is expensive.

The present invention may provide an infrastructure consisting of a standard browser based client that exists today, along with a back-end that provides features that are drastically different from the current offerings in terms of the workflow and the data flow. The client of the present invention may consist of the application code for the presentation layer as either a HTML 5 client or as a dedicated application specific for the underlying operating systems, notably iOS® from Apple Inc. and Android® from Google Inc. Regardless of whether the client is either an HTML 5 client for PCs or a dedicated application for proprietary mobile devices OSs, the clients do not directly access the back-end database all the time. They access a small footprint of the user data most of the time on the local database that resides on a client machine. If and when required, the client seamlessly retrieves additional data from the backend that resides entirely in the cloud as opposed to a relational database. Further, the backend, in addition to sending the data to the client, syncs the client database with the latest updated data from the backend without any client intervention, and it continues to sync the data without additional or further client interaction.

A further differentiation exists where the current offerings deliver the HTML page that is compiled on the server side in a MVC (Model View Controller) object design pattern. In the MVC pattern Model, the Controller is a module that receives and processes all of the requests from the client. Then the presentation layer, which is the view, gets compiled and then delivers to the browser an HTML stream, which is then displayed by the client browser Web Server On the back-end, a system of the present invention starts with an Internet/Cloud facing industry standard web server such as Apache.

Application Server

In the older model n tiered web architecture, the middle tier consists of a dedicated application server, such as WebSphere, Oracle, or the like. Here, there is no need for a full-fledged J2EE application server component in the architecture of the present invention. A lightweight application server acts as a controller/dispatcher and is embedded within the cache adapter. The main reason for this is that in an embodiment of the present process, the application code is shipped to where the data resides as opposed to transporting the data to where the application code resides. The client has a small footprint database, and this database constantly syncs itself with the back-end database. The client accesses the local database for the presentation of data to the user. The presentation layer code resides in the client in mobile device clients, whereas for HTML5 clients, the presentation layer code is in HTML5.

Database Server

As depicted in FIG. 2, the database tier consists of a cache adapter 200 sitting on top of a distributed file system 270. As described above, it is very different from anything currently designed in the sense that a lightweight application server 250 is embedded as part of the cache adapter 200, as opposed to a true n tiered architecture with separate application and data tiers. There are two data cache components in the system of the present invention—one resides in the client as a client database (cache) 240, 241 that is specific to the client machine, while the other data cache is the Cloud-Cache, e.g., comprised from nodes 260,261,262, that resides in a clustered node residing in the cloud. The CloudCache sits in nodes on top of a distributed file system 270— clustered nodes residing in the cloud as depicted in FIG. 2.

The system of the present invention may have two main components: a lightweight web server cluster 210 and a cache adapter 200 (with an embedded lightweight application server 250), which acts as the database server, in accordance with the present invention. The data flow in the system is captured in FIG. 3. A client may submit two types of requests to the back-end. The request may either be for a retrieval of the stored data or a submission (storage) of new data.

A data retrieval request, according to the present invention, is straightforward. The client 300 requests the data 310, which is likely available in the local database on the client machine, if so, the request never leaves the client machine and is fulfilled within the boundaries of the client machine. In the instance where the data does not reside in the client machine cache, then the request is presented to the backend. If the requested data is not present in the client database, the incoming request is intercepted by the storage map 325 in the cache adapter, which provides the request with the location of the requested data. The data location is a pointer to the cached data if the data is not in the cache, then data (archived data) is retrieved from the distributed file system in a raw unstructured format 360. The data from the distributed file system is first retrieved, then converted to a cache compatible format 355 and finally is sent over to the client cache. Upon receipt of the requested data, the client displays the data for the client.

The data submission request has some additional steps compared to the simple client data request. First, the data is initially sent to the Cache Adapter (CloudCache to be specific), then it is converted to a back-end data cache format by the Write Cache Adapter 330. The back-end data cache 340 always stores the most recent data for client access; however, at this stage, the data is temporary and not visible to the client. The data is further converted to a distributed file format 350 and saved. Upon successful storage of the data in the file system 360, the cache sync adapter 370 retrieves the stored data and sends it to back-end cache 380. A bit check is performed to make sure that the data is tallied up with the temp data saved in the cache, and upon a successful check, the data lock is released with the data becoming available to the client.

In addition to the above, the back-end system constantly updates client data cache with the latest back-end data cache on a regular basis. This constant bi-directional sync is depicted by the heavy dotted lines in FIG. 2.

In a relational database, the data for multiple users is arranged in a single or partitioned multiple tables in a given instance of the database. In the current n tiered architecture, a client request is sent to a web server and then onto an application server. The application server analyzes the request, requests specific data from the database, processes the request and then sends the response back to the client. In the architecture of certain embodiments of the present invention, a client request is sent to the web server and then onto the lightweight application server (LAS). The LAS analyzes the request; but instead of requesting the data from the database, it sends the request to the cluster node, where the data resides along with any application code.

The distributed file system is the main medium for persistent data. All bulk data related queries are specifically directed to the distributed file system and do not touch the cache. So, essentially, all data related user queries to the cache are for data for a single user from a client interface. The data in the data cells are the end product of all data processing that occurs within the distributed file system cluster; and the data from the cache is mostly used for client display and interaction purposes.

An advantage of the architecture of certain embodiments of the present invention is that instead of retrieving and returning the data to an application server, the request is directed to the cache adapter, which then sends the request over to an appropriate node in the cluster where the pertinent dataresides.

Figure 7:
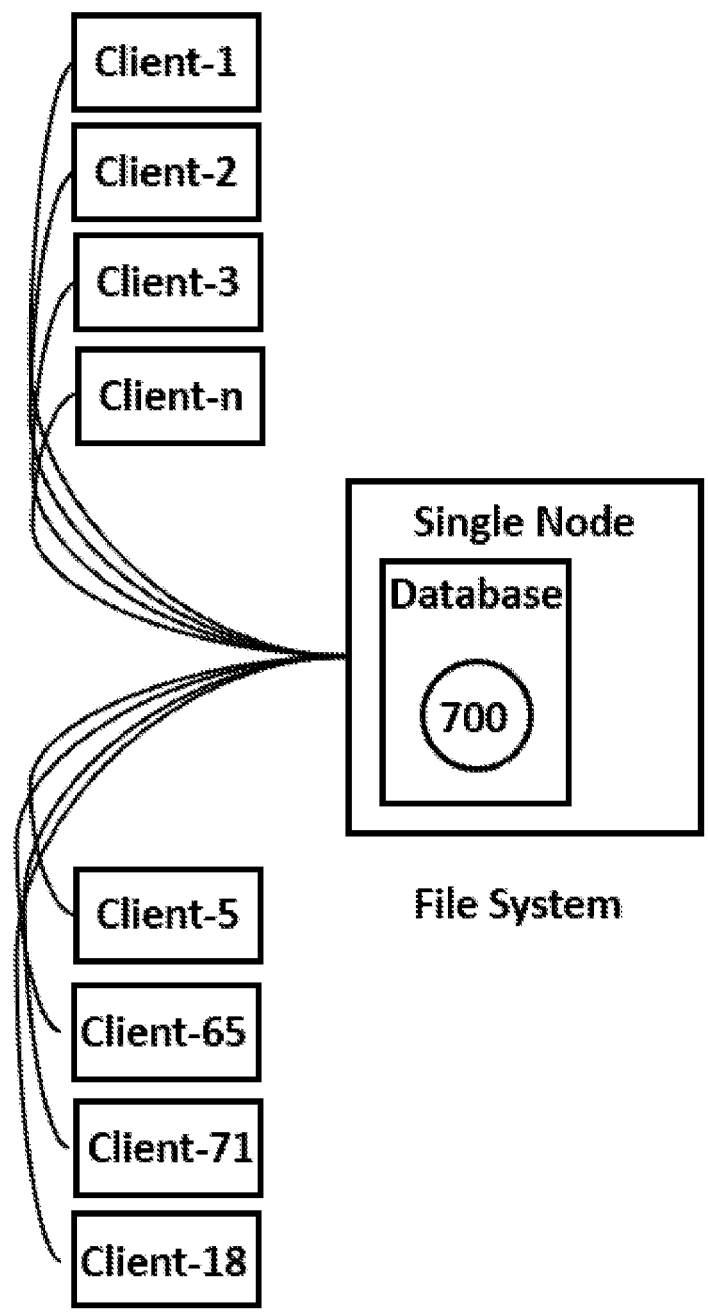
FIG. 7 is a diagram depicting the architecture of certain embodiments of the present invention where clients are communicating with the single instance of the database.
Figure 9:
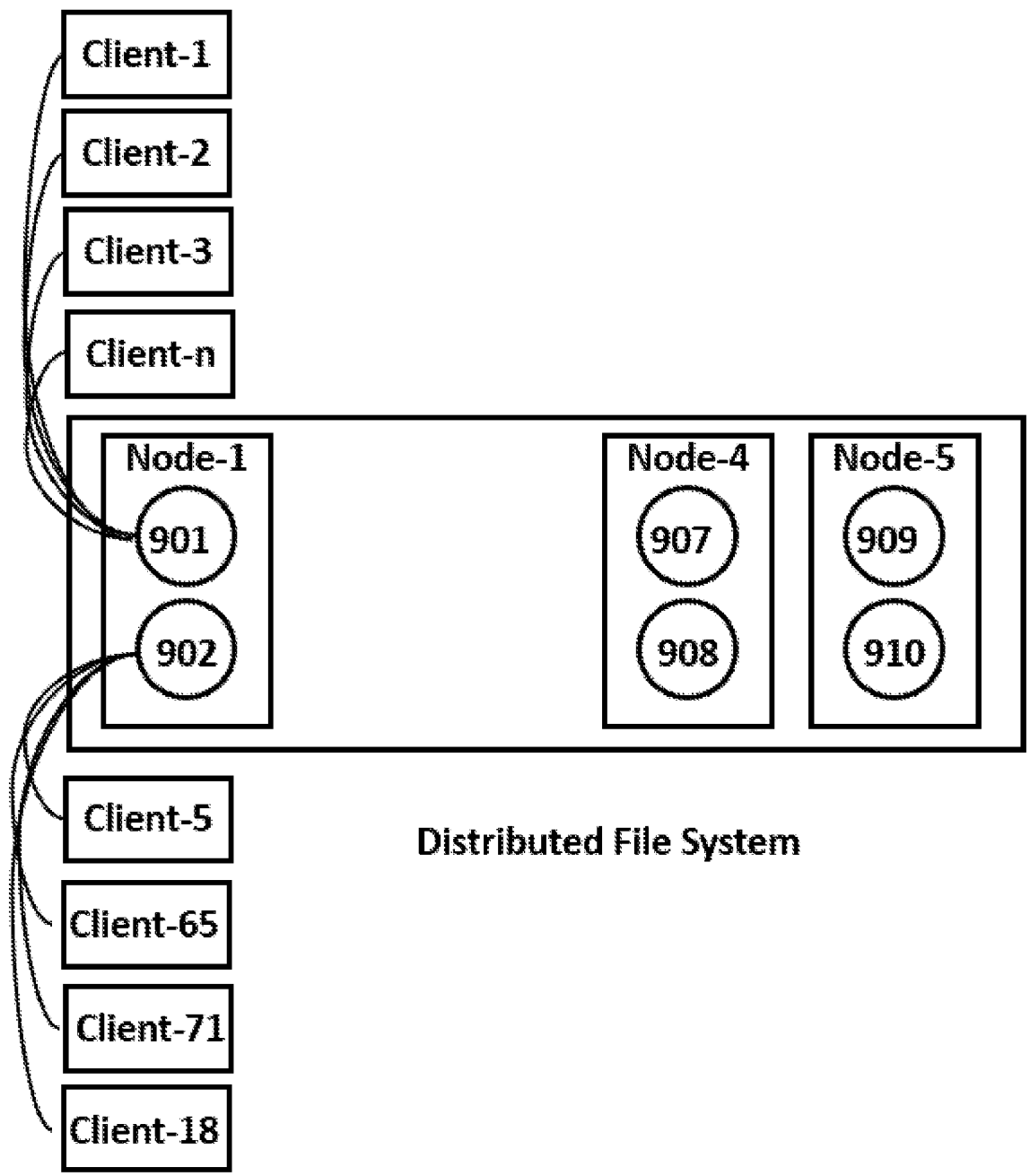
FIG. 9 is a diagram depicting the architecture of certain embodiments of the present invention where multiple instances of the database are communicating with clients in parallel.
Figure 10:
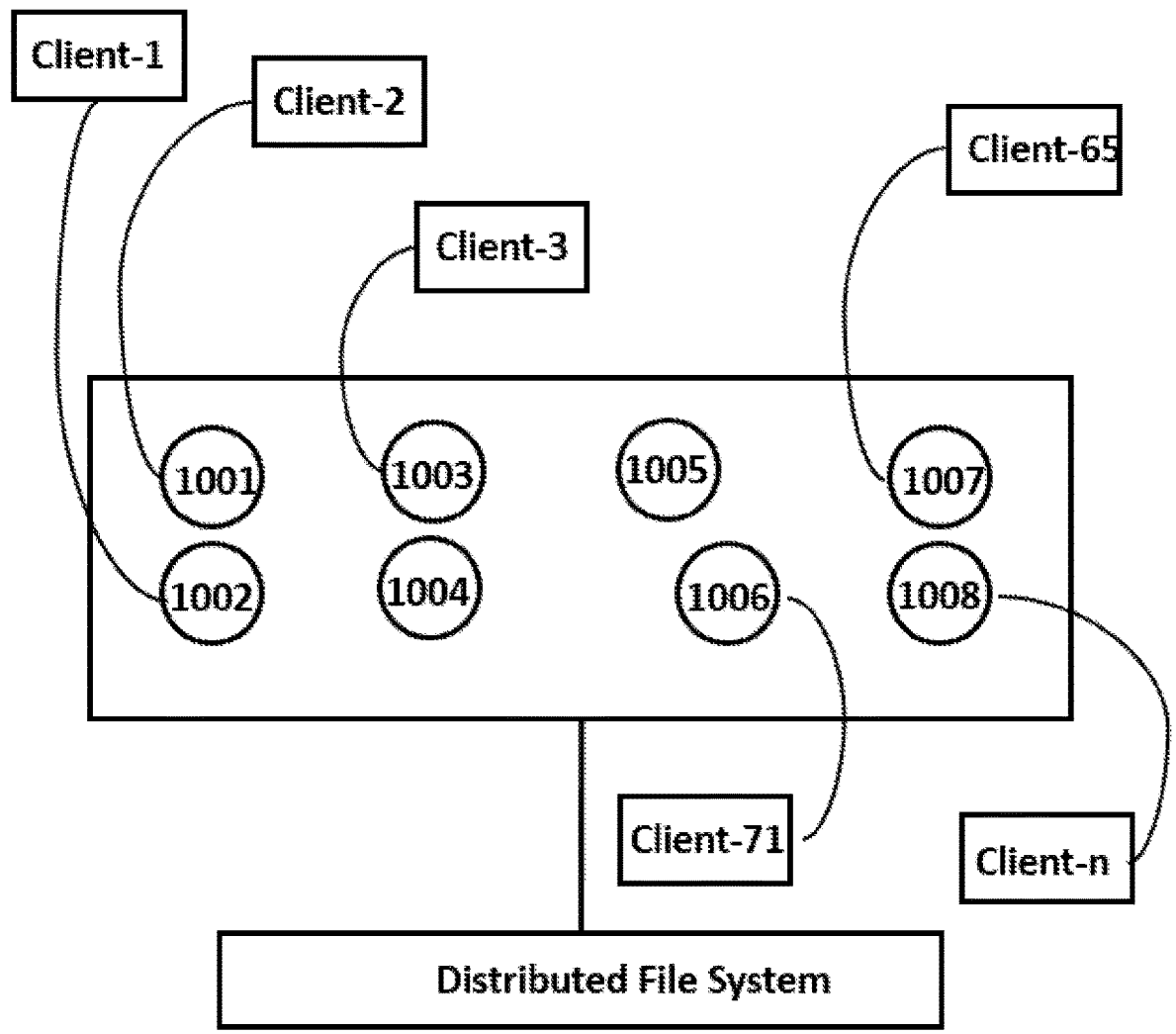
FIG. 10 a diagram depicting the architecture of certain embodiments of the present invention where multiple instances of the database are communicating with clients in parallel and where each client has a database instance of its own.

As depicted in FIG. 7, data may be stored in and retrieved from a single database instance. One can partition the database onto multiple machines; however, the instance is always singular, and the request flow still has to pass through a single relational database management system instance 700. This is a potential single point of failure. As depicted in FIG. 9, in certain embodiments of the present invention, there may be a backend infrastructure with multiple instances 901-910 of the database that can communicate with clients in parallel. This design may be extended to allow each client to have a database instance of its own, which can enhance throughput and linear scalability.

As the number of clients increase and the size of the data begins growing exponentially, the model becomes unsustainable at some point because of the input/output limitations of a single machine that administers the data flow and locking. Since the instance resides on a single machine, regardless of the power of the machines housing the database, the model cannot sustain such extremely large data loads from applications, which require very large data sets thereby requiring tremendous computer processing unit churning power. There have been some innovative solutions such as sharding and data archiving, but almost all of them require manual intervention and are still prone to a single point of failure.

In the case of a system failure, there are some elegant solutions available for disaster recovery, but those processes take significant time to implement and dramatic consequences could result due to a prolonged outage. Data replication can be used to reduce disaster recovery times, but this involves additional costs and compromises regarding the data that resides in active tables versus archived tables.

Figure 4:
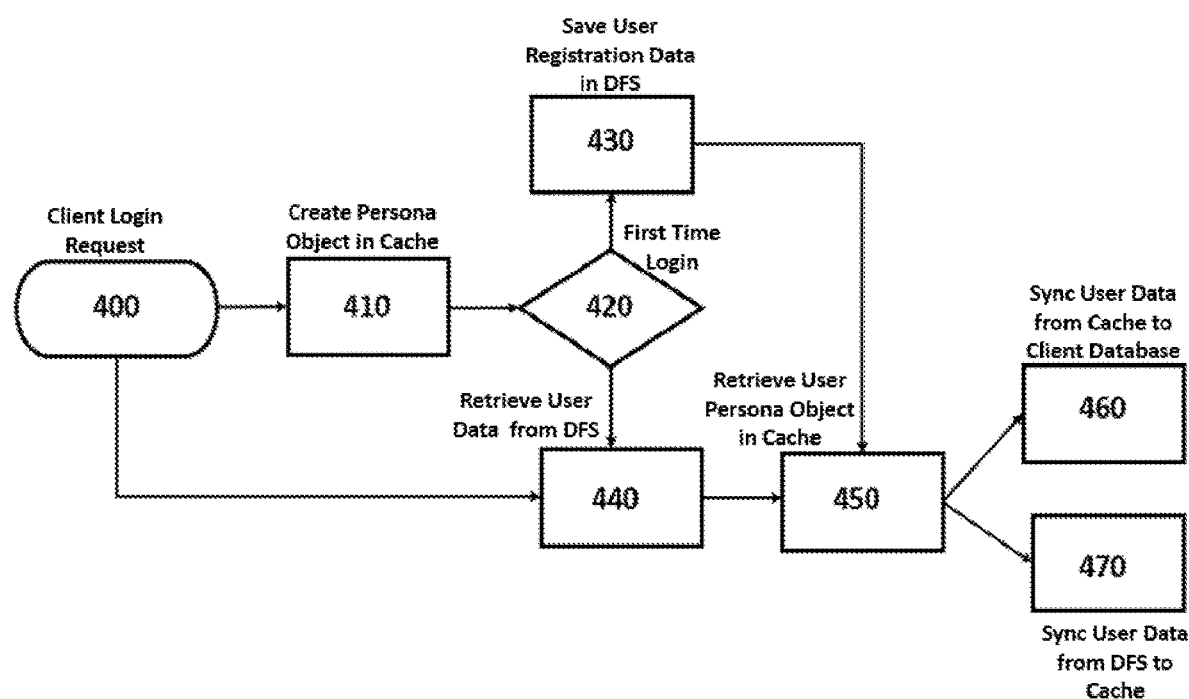
FIG. 4 is a flow chart of data flow following a client login to establish a user persona using an embodiment of the present invention.

As illustrated in FIG. 4, every user upon login sends a login request 400 over to the system backend. The system creates a unique persona object 410 for the user in the CloudCache in the least busy Node in the cluster. The system then further creates an empty shell of vertical object graph for each vertical that the user has subscribed. There are two types of user login requests—one first time login 420 and the other being a subsequent login.

A first time login entails instantiating a user profile object and then populating the same. For the first time login or initial use registration, a user persona object creation is followed by the creation of an empty shell of the data schema for each vertical that the user may have subscribed to at the time of the registration 430. Upon subsequent logins, a user can register for additional verticals, or decouple them if they so desire. Attaching a vertical to a given profile may be accomplished. All of the data in the data cell is persisted to a distributed file system for permanent storage.

For each subsequent login, upon receiving the login request, the backend creates a user persona object 450, retrieves the user specific data 440, and populates the user persona object with specific data associated with the user object. Further, the backend creates an empty shell of all the verticals that the user has subscribed to and then populates the vertical shells 460 with data from the distributed file system.

The backend is responsible for retrieving data from the distributed file system to CloudCache. Additionally, the backend is also responsible for syncing 470 the cached data from the data cell to the client database residing on the client machine.

Every user in the proposed system is identified by a Unique Key, creating a one-to-one relationship with the UserLoginId. The Unique Key is generated by reversing the domain name to start with (similar to key identifier creation in Big Table by Google) and ending with the unique UserId created by the user at the time of registration and first time login.

For a user with the user id, UseridO, the key would look like the following: com:cloudcomponents:dbinstance:useridO On the backend, the system creates a unique data cell for every user. A data cell is a portion of the cache that the cache adapter reserves for every user. Each data cell is identified by the unique UserId associated with the user.

Figure 5:
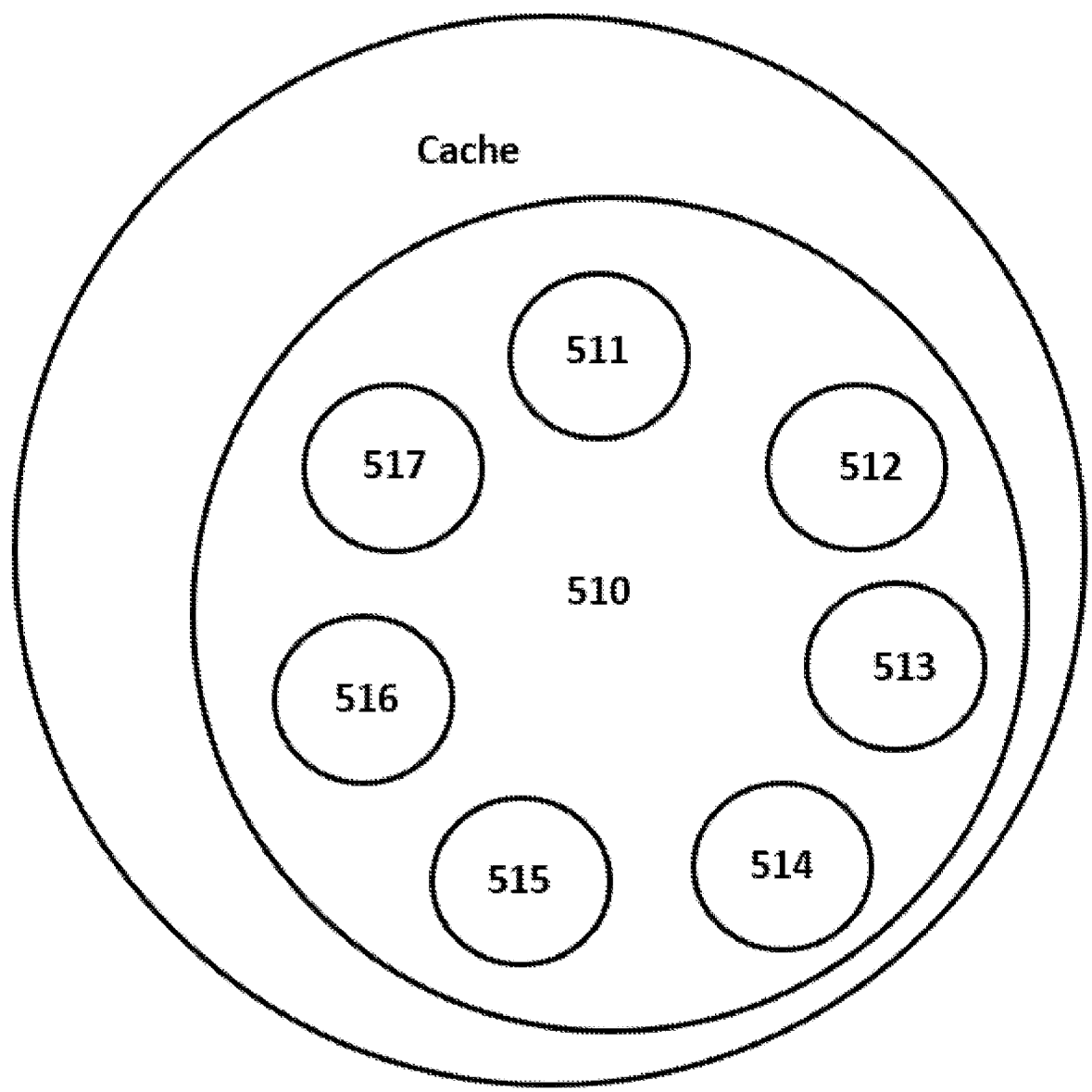
FIG. 5 is a diagram depicting data cells in an embodiment of the present invention.

FIG. 5 shows a graphical view of a data cell of a user. Within the data cells 510 are a group of embedded data cells 511-517 with each one of them holding the user data for each corresponding vertical. Each one of these embedded cells has a specific and unique structure that relates to a specific industry vertical.

In a traditional relational database, the data are arranged in tables in a single instance of the database. A given table will contain data for multiple entities. A simple example of an entity in this case would be a user. Each user is identified by a unique UserId. For a given entity, data related to that entity could be spread out in multiple tables across the database instance. Sometimes, there are hundreds of tables, but it always keys off of an original EntityId. This allows a single table in the relational database to store data for multiple users. To manage data using a traditional relational database, there have been instances wherein people have made use of simple partitioning of the data on multiple machines and/or sharding the data on multiple machines. This requires manual intervention, and the model is unsustainable in a cloud based environment due to input/output limitations of the machines and the data location in one central place for geographically diverse users.

The cache adapter has the ability to create an instance automatically. The cache adapter starts by creating a CloudCache as a single contiguous cache (reserved portion of multiple machines). The cache adapter creates an instance that has an upper limit in terms of its size based on a "max size" parameter in the configuration file. After creation of the instance, the cache adapter starts populating the instance with active (logged in) user data. If and when the instance reaches its max size and cannot store any more data, the cache adapter creates a new instance. There is no limit to how many instances the cache adapter can create. The storage map maintains the directory listing of all instances and UserIds that are stored in those instances. The data stored in cache is processed data ready for client consumption (client reporting).

By creating multiple instances of the database, as opposed to a traditional single instance, allows the system to spread the workload across multiple instances (nodes/machines). Once the client request is directed to an appropriate database instance, the communication is confined to the client and the instance. This is achieved by constructing a UserId that consists of a domain:databaseinstance:UserId, which is different than a simple unique UserId within an instance. Further, within every instance for every user, there are object graphs for holding data for all verticals that the user is registered.

In a relational database, one may attempt to create all tables in the same instance, but as the number of tables and the size of the data increases, the model becomes unsustainable due to performance degradation. The primary reason for the failure is the input/output limitations of a physical system or the limitations of configuring and coordinating multiple systems if the database is partitioned.

The architecture of certain embodiments of the present invention removes the input/output bottleneck by creating multiple instances of the database. Creating multiple instances adds complexity to the system as a whole in terms of data consistency; however, this is resolved by implementing a smart directory structure called Storage Map. The Storage Map keeps track of every instance that is activated or deactivated. In addition to the listing of all instances, the Storage Map also tracks data distribution based on each UserId within each instance. FIG. 7 depicts the Storage Map and data cell contents.

Further, the data cell for a given UserId has only one single instance of that user profile across all database instances. All transactions related to that user profile are queued up and processed serially within that single instance.

As part of the registration or post-registration process, a user can subscribe to one or more industry vertical apps in the system. Each vertical has a data layout that uniquely captures attributes related to an industry segment. This layout upon subscription by the user gets attached to the unique user profile. There is no limit to the number of verticals a user can attach to their persona.

Figure 6:
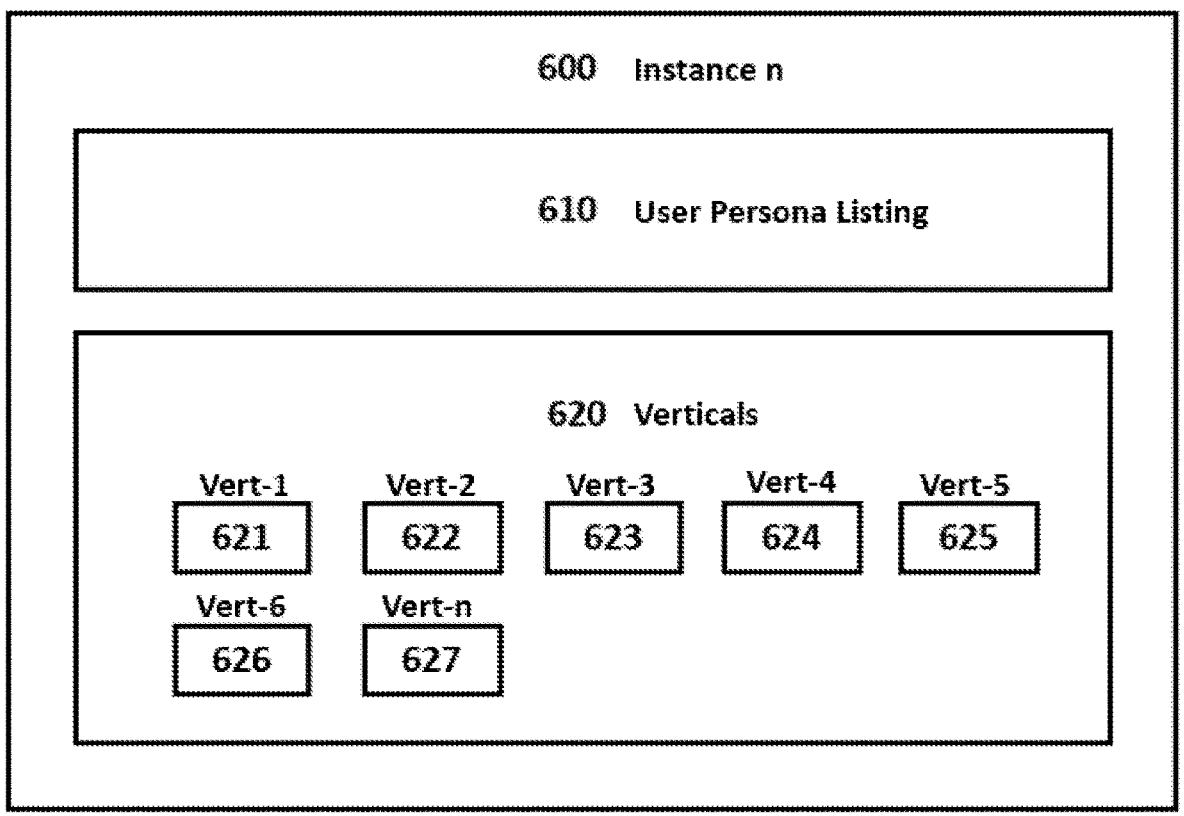
FIG. 6 is a diagram depicting a user subscription to one or more vertical applications in an embodiment of the present invention.

FIG. 6 depicts a cross section of an instance 600 from a different perspective. The user persona 610 is the central object, which reflects the user identity. Various industry vertical segments 621-627 can be attached to a given user persona. Verticals 620 may involve data relevant to the contexts of social networking, medical records, contact relationship management, personal and enterprise media storage, personal and enterprise document archiving, financial services, electronic gaming, and collaboration, and the like.

Figure 8:
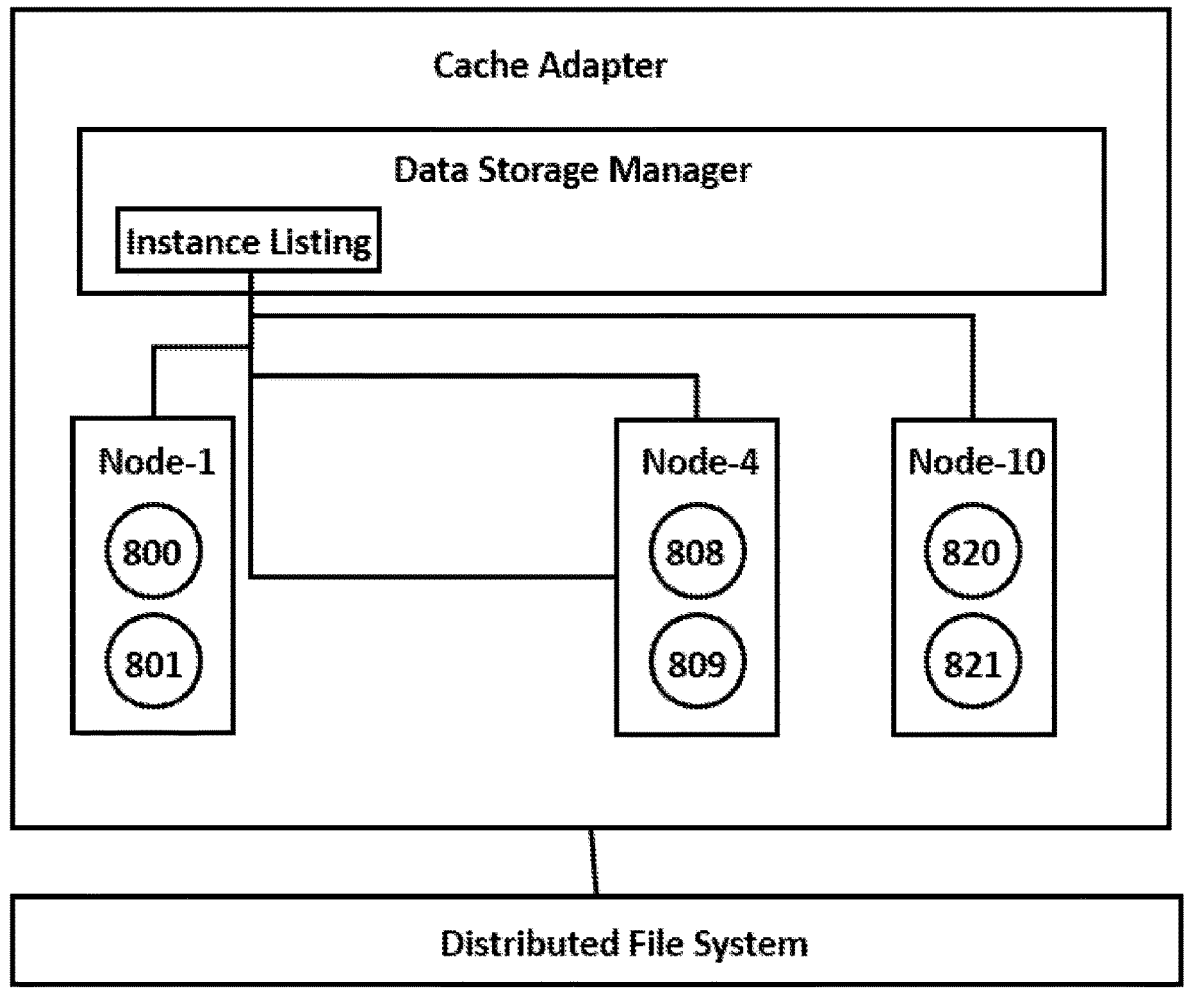
FIG. 8 is a diagram depicting the backend synchronization of user data in a data cell with a client machine database according to an embodiment of the present invention.

As FIG. 8 depicts, the backend syncs the user data in the data cell with that of a client machine database. Upon each login, the user presents the UserId along with a password as credentials to the backend. Using the UserId, the backend retrieves the data from the file system and creates a cache entry for the user persona object for that user in the form of a data cell 800-821 and establishes a data sync link with the client machine. A user can login with the same UserId from multiple machines, as long as, all client machines have been previously registered in the system. Multiple machines can access the system with the same UserId, and once those machines are linked, their databases will sync up with the latest user data from the data cell.

The data in the data cell are permanently persisted in a backend distributed file system. Upon receiving a request from the client, the backend Storage Map directs the data request to an appropriate database instance that contains that client's data. Once the data cell is located based on the UserId, a connection (communication channel) is established to the data cell instance that corresponds to that specific UserId. The backend also sets and sends a security token along with the response. Every subsequent request is accompanied by this security token. If the security token is invalid (due to timeout or something else) or is missing, then the backend requests the client to re-login into the system.

The architecture of certain embodiments of the present invention may be applied to a social networking application, for example, Facebook. In 2008, it was speculated that the site had 1,800 servers dedicated to MySQL and 805 servers dedicated to memcached. However, multiple MySQL shards and memcached instances can run on a single server, virtually, and therefore, the number of physical servers running the infrastructure could be less. Recently though, rumors had the number of MySQL servers in excess of 4000 and a similar proportionate number dedicated for memcached data. That number of machines represents a substantial increase from 2008 and would project in the future to an unsustainable number should the growth projections remain on course.

MySQL, or for that matter, any relational database, was not designed with the data sizes and throughput that is necessary for the Cloud. The main drawback of any RDBMS is the single instance along with the overhead that is involved in locks for ACID transaction compliance, buffer pools or memory swap space. While one could try to create multiple instances, but then the application would need to be designed with the data splits across the instances and multi-phase commits amongst multiple instances. This creates numerous hurdles, such as rollback in the case of commit failures, disaster recovery, etc. The embodiments of the present invention contain multiple instances, which can communicate with the clients directly rather than through a single RDBMS coordinator.

In the architecture of certain embodiments of the present invention, there are multiple instances of the database that work independent of one another. This is achieved by first taking the data distribution and location directory (maintained in Storage Map) outside of the main database, creating data cells that confine the data for a single user within a single data cells. Our solution allows the workload to be distributed across multiple instances to be executed in parallel. The only requirement for the above mode of execution is that the data requests for each single user be directed to a dedicated data cell for all data writes.

A generic table in a traditional Relational Database that contains user data is represented below. It is a snapshot of a User table at a given point. For example, this table could contain UserIds that exceed 500 million represented by the same number of rows in the table.

| UserId | First Name | Last Name | Zip Code |
|---|---|---|---|
| 1 | John | Smith | 10170 |
| 2 | Frank | Clark | 10017 |
| I | | | |
| I | | | |
| I | | | |
| 600000000 | Mark | Baker | 22150 |

If every user has at least five friends, the table that manifests this relationship between users, a "Friendship table," by way of example, would be created.

| UserId | Friend_User_Id |
|---|---|
| 1 | 6 |
| 1 | 5 |
| 1 | 4 |
| 1 | 3 |
| 1 | 2 |
| 2 | 1 |
| 2 | 9 |
| 2 | 8 |
| 2 | 7 |
| 2 | 6 |
| 500232657 | 1 |

Accordingly, this table would need a minimum of 500,000,000×5 rows to accommodate 5 friends for every user.

If the UserId is planning to travel to a certain Zip Code and would like to find out if any of his friends in that Zip Code has free time on their calendar during his visit, a query of that sort will have to create a join between three tables. Although queries can be optimized by making use of indices, it is just a starting point; as the object graphs get more complicated, the system becomes more complicated to program.

In the architecture of certain embodiments of the present invention, there could be tables comparable in size or in excess of a 100 times larger than the Friendship table example, but these tables reside in a distributed file system and are used only for data processing. User queries never query these tables since all user related data for a single user will always reside in a single data cell. So, in the UserId Zip Code query example, in the architecture of certain embodiments of the present invention, the application would send a request to the data cell for that User, locating the data cell for that user using the Storage Map. Once in the data cell, the application scans through the Friendship table, which has the number of rows equal to number of friends—a scan that is much more manageable than querying a table with 500,000,000×5 rows. Although indexing, locking in combination with partitioning of the data, might ease the burden relatively, the physical limitations of a given machine create a bottleneck. Such a model would be financially unsustainable even with the allocation of more resources (multiple nodes/machines). Upon filtering through the row of friends for users in the desired Zip Code, the application can then interact with the calendar object of the friends (filtered users). This scenario is more efficient and faster than scanning the billions of rows in a traditional relationship database setup. The architecture of certain embodiments of the present invention reduces the size of the working data set for the client requests. This is achieved by having the incoming requests work with single data cells as opposed to tables with an extremely large number of rows or queries executing joins of large tables spanning partitions.

Multiple instances provide a distribution of workload. Data cells provide further branching of the workload. A well-designed multi-threaded application can exploit this feature and provide multifold throughput. Data cells sync with the client without any assistance from the database controller thereby allowing multi-channel secure communication between the backend and multiple clients simultaneously. The distributed file system provides a robust backend for disaster recovery. The cache adapter's ability to create and destroy data cells in memory allows the system to be extremely responsive with low latency.

Embodiments of the present invention described herein are exemplary only. One skilled in the art may recognize variations from the embodiments specifically described herein, which are intended to be within the scope of this disclosure. As such, the invention is limited only by the following claims. The present invention covers such variations provided that they come within the scope of the appended claims and their equivalents.

What is claimed is:

1. A process for distributing cache data in a data system comprising:
   reserving with a cache adapter a designated portion of memory in at least two nodes in a distributed file system comprising clustered nodes to form a contiguous memory space spanning across the clustered nodes, wherein each node comprises a plurality of data cells capable of storing data in an unstructured or structured format;
   embedding a lightweight application server comprising an application code within the cache adapter;
   interfacing a client cache at a front-end of the cloud data system and a distributed file system at a back-end of the data system with the cache adapter, wherein the distributed file system bi-directionally synchronizes with the client cache;
   providing an interface for external clients at the front-end of the data system to access the data with the cache adapter;
   communicating bi-directionally to the external clients via a web server with the cache adapter, wherein the cache adapter comprises data cells configured to store data in a relational database table format;
   the cache adapter is configured to move data between the data cells in the cache adaptor and the distributed file system, wherein the data is persisted in the distributed file system; the cache adapter is configured to create at least one instance that has an upper limit in size, wherein when the instance reaches the upper limit, the cache adapter automatically creates a new instance;
   the cache adapter further comprising a storage map comprising a directory of a plurality of instances and a plurality of UserIDs stored on each instance,
   analyzing, by the lightweight application server, an incoming request of a user to determine an UserID; and
   based on the UserID and the Storage map, sending the incoming request to a data cell that contains all user related data for the user,
   receiving a response from the data cell and transmitting the response to the front-end client cache; and the lightweight application server acts as a controller and is configured to ship the application code to a location of the data.

2. The process according to claim 1, further comprising interfacing the client cache and the distributed file system using java database connectivity.

3. The process according to claim 1, further comprising lightweight application server accessing the data that resides on the distributed file system directly.

4. A distributed cache data system comprising: a front-end client cache residing on a client machine; a back-end distributed file system comprising data cells capable of storing data in an unstructured format in clustered nodes, wherein each node comprises a plurality of data cells capable of storing data in an unstructured or structured format; a cache adapter comprising data cells capable of storing data in a structured format residing in the clustered nodes wherein the cache adapter is configured to reserve a designated portion of memory in at least two nodes to form a contiguous memory space spanning across the clustered nodes; and a lightweight application server comprising an application code embedded within the cache adapter; wherein the cache adapter comprises data cells configured to store data in a relational database table format; the cache adapter is configured to move data between the data cells in the cache adaptor and the distributed file system, wherein the data is persisted in the distributed file system; the cache adapter is configured to interface with the client cache at the front-end of the distributed cache data system and a distributed file system at the back-end of the distributed cache data system, wherein the distributed file system bi-directionally synchronizes with the client cache; the cache adapter is configured to provide an interface for external clients at the front-end of the distributed cache data system to access the data; the cache adapter is configured to bi-directionally communicate to the external clients via a web server, the cache adapter is configured to create at least one instance that has an upper limit in size, wherein when the instance reaches the upper limit, the cache adapter automatically creates a new instance;
the cache adapter further comprising a storage map comprising a directory of a plurality of instances and a plurality of UserIDs stored on each instance,
   the lightweight application server is configured to analyze an incoming request of a user to determine an UserID; and
based on the UserID and the Storage map, send the incoming request to a data cell that contains all user related data for the user,
receive a response from the data cell and transmit the response to the front-end client cache; and the lightweight application server acts as a controller and is configured to ship the application code to a location of the data.

5. The distributed cache data system according to claim 4, wherein the cache adapter is configured to interface with the client cache and the distributed file system using a java database connectivity interface.

6. The distributed cache data system according to claim 4, wherein the lightweight application server is configured to access the data that resides on the distributed file system directly.

7. The distributed cache data system according to claim 4, wherein the cache adapter is configured, upon a request for data from the client cache, to first check if the data is available within the cache, if the cache does have the requested data, the cache serves out the data from the cache; and if the data does not exist within the cache, the cache adapter retrieves the data from the distributed file system and then either sends out the requested data directly to the client cache or caches the data in the cache adapter before sending the data to the client cache.

8. The distributed cache data system according to claim 4, wherein the cache adapter is configured to store and retrieve the data in a structured relational data format, then convert the data to one of a distributed file system and an intermediary database that is unstructured; and the cache adapter is further configured on a return route to convert the unstructured data from a distributed file system, or the intermediary database, into a cache compliant format.

9. The distributed cache data system according to claim 4, wherein the client cache comprises a mobile device specific application or an HTML application client.

10. The distributed cache data system according to claim 9, wherein the client cache comprises a presentation layer, a client database, and a persistent socket connection to the cache adapter.

11. The distributed cache data system according to claim 4, wherein the cache sits in the at least one node on top of a distributed file system.

12. The distributed cache data system according to claim 4, wherein the cache adapter creates a unique instance of cache for each user which functions as a relational database with a SQL interface for applications interfacing with the cache adapter.

13. The distributed cache data system according to claim 4, wherein the cache adapter resides in front of the distributed file system.

14. The distributed cache data system according to claim 4, wherein the cache is a contiguous space that stretches across all designated portions of the networked cluster of machines described within a configuration file.

15. The distributed cache data system according to claim 4, wherein the data cells of the at least two nodes in the cache adapter are not communicating directly with the client cache.

16. The distributed cache data system according to claim 4, wherein each data cell contains multiple data tables for single or multiple users.

17. The distributed cache data system according to claim 4, wherein an adapter process framework is configured to convert the data from one format to the other on requirements of a functional call.

* * * * *